W. Smith.
Weaving Colored Fabric.

No. 2,844. Reissued Jan. 14, 1868.

Witnesses:
Lewis W. Serell
Chas Serell

Inventor:
Wm Smith

N. PETERS, PHOTO-LITHOGRAPHER, WASHINGTON, D. C.

UNITED STATES PATENT OFFICE.

WILLIAM SMITH, OF NEW YORK, N. Y.

IMPROVEMENT IN WEAVING.

Specification forming part of Letters Patent No. 9,653, dated April 5, 1853; extended seven years; Reissue No. 2,656, dated June 18, 1867; Reissue No. 2,844, dated January 14, 1868.

DIVISION C.

*To all whom it may concern:*

Be it known that I, WILLIAM SMITH, of the city, county, and State of New York, weaver, have invented, made, and applied to use certain new and useful Improvements in Looms for Weaving; and I do hereby declare that the following is a full, clear, and exact description of the same, reference being had to the annexed drawings, making part of this specification, wherein—

Figure 1:
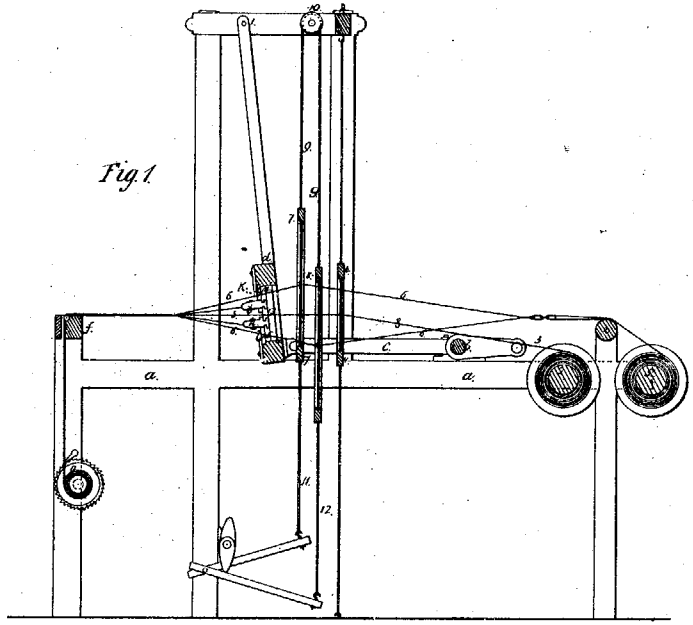
Figure 2:
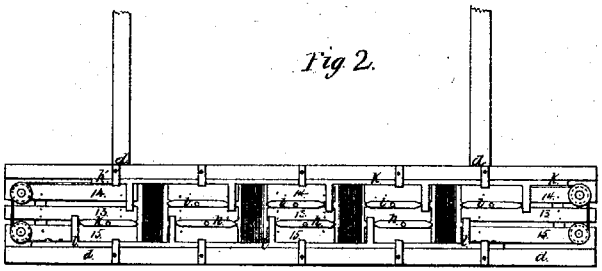
Figure 3:
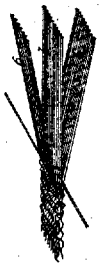

Figure 1 is a sectional elevation of the said loom. Fig. 2 is a front view of the lay, and Fig. 3 is a perspective view illustrating the mode of weaving the fabric that is formed by this loom.

The like marks designate the same parts.

The object of this invention is to produce by weaving a fabric that has a center warp inclosed on each side by weft-threads held in place by interlaced warps.

The nature of this division of my said invention consists in an improvement in looms whereby I am enabled to introduce a stationary warp and weave on both sides of it a fabric that firmly incloses it.

*a* is the frame of the loom, of any convenient form, carrying the driving-shaft *b*, that is moved by any competent power.

*c* are the connecting-rods from cranks on the shaft *b* to the lay *d*, that is supported by and vibrates on a rock-shaft, 1.

2 is a warp-roller, kept from turning freely by the friction of a strap or any usual means, so that the warp 3 is given off when at the required tension, as now practiced. The warp 3 is to be of india-rubber strips, if the fabric is to be corrugated and elastic; or this warp may be cotton or any fibrous substance where a thick quality of goods is required. This warp passes through the stationary heddles 4 and through the reed *e* in the lay over the breast-beam *f*, the fabric as it is formed being wound by any usual means on the roller *g*.

5 is the warp-roller, supplying the warp 6 for the two sheds. The warp passes through heddles 7 and 8 and through the reeds *e*, forming the fabric with the warp 3 and filling, as hereinafter shown. The heddles 7 and 8 are worked by any competent means, the one being fitted to ascend as the other descends. In the drawings these are shown as connected by straps 9 over a pulley, 10, the straps 11 and 12 being connected from the under side to treadles to be worked by cams from an auxiliary shaft or by the feet in the usual manner when power is not used.

The lay itself, in front of the reeds *e*, is shown as formed to receive two shuttles having a center piece, 13, with a rib on each edge, an upper piece, 14, and a lower piece, 15, all attached to the body of the lay so as to receive and sustain the shuttles *h* and *i* by the ribs taking grooves in the top and bottom of the back edge of the shuttle, and the length of the shuttle being greater than the width of the reeds, one end enters the groove before the opposite end is disengaged. The shuttles are propelled by means of a frame, *k*, with projections depending from the same to give the blow and propulsion to the upper shuttle, and the lower shuttle is moved by a similar frame, *l*, and projections.

Fig. 1 shows a means by which these frames may be moved, the ends of the top and bottom parts being connected by straps over pulleys, so that one travels one way, while the other travels in the opposite direction, and by an ordinary picking motion, if in a power-loom, or the usual strap for a hand-loom, applied to move either frame, the shuttles are thrown in opposite directions through the sheds above and below the warp 3. This loom is especially intended for use in weaving corrugated elastic fabrics, several pieces being woven at the same time.

I wish it to be distinctly understood that I do not limit myself to the means for moving the shuttles as instead of the frames *k* and *l* racks may be used, that in their motion rotate pinion-wheels fixed on the lay, that take a rack in the side of each shuttle, one pinion taking hold of one end of the shuttle before it clears the other pinion, thus drawing the shuttle through the shed, even if the motion be not sudden enough to throw the shuttle; or both shuttles may be thrown through the sheds in the same direction at the same time.

The two shuttles carry bobbins with filling, as usual, and the loom in working forms a fabric, as shown in large size in Fig. 3, the warps 6 passing up and down through the stationary center warp, 3. The filling from the upper shuttle, *i*, forms a fabric on one side of the warp 3, while the filling from the lower shuttle, *h*, forms a fabric on the under side. Thus the warp 3 is inclosed, and in weaving india-rubber elastic goods my loom and mode of weaving are especially useful, and have advantages over other looms for the following reasons, which reasons apply to a certain extent to the weaving of other fabrics than india-rubber:

First. When a warp of india-rubber has been inclosed in a woven fabric, it has been done by one shuttle passing over and depositing its filling, the rubber then being raised and the shuttle passing beneath it, the warp and filling interlacing on each side of the rubber cord, and forming a woven pocket for the said cord. In this mode of weaving the fabric has ribs produced on its surface, caused by the india-rubber in raising or lowering embedding itself, leaving the india-rubber thread loose within the woven covering, which is raised on each side; but by my arrangement, the india-rubber being stationary, but a slight rib is formed on the surface of the goods, and the rubber is held tightly by the warps, and is not liable to draw into the fabric at its ends when said fabric is cut crosswise of the rubber.

Second. When two shuttles have been used with different or the same kinds of filling, one passed through the shed and then the india-rubber raised up to let the second shuttle pass beneath it. This produces the same imperfections in the goods that are manufactured.

Third. With both the foregoing old methods for weaving elastic goods, the india-rubber, being moved against the surfaces and edges of the reeds, is subject to constant wear and friction, often breaking the india-rubber warp, whereas in my loom, the rubber, remaining stationary, is not subject to so much wear.

Fourth. By using two shuttles, as herein shown, a saving of time is effected, because under the old method first one side was formed and then the other of the fabric, my method requiring but about half the time, thereby producing a corresponding saving in cost.

Fifth. Where but one shuttle is used in weaving elastic fabrics, an expense is incurred which can be saved by my loom, as these fabrics are usually formed entirely with silk, while in mine I can use silk from one shuttle to form the side which is seen, while a filling of cotton or similar fabric from the other shuttle may form the under side, thereby saving much cost for material.

I do not claim two shuttles, as two or more have been used in various kinds of weaving; but

What I claim, and desire to secure by Letters Patent, is—

The heddle, or its equivalent, for supporting the stationary central warps, in combination with mechanism, substantially as set forth, for performing the weaving.

In witness whereof I have hereunto set my signature this 7th day of September, A. D. 1867.

WM. SMITH.

Witnesses:

GEO. DENNETT WALKER,
CHAS. H. SMITH.